(12) United States Patent
Ben-Artzi et al.

(10) Patent No.: US 8,316,024 B1
(45) Date of Patent: Nov. 20, 2012

(54) IMPLICIT HIERARCHICAL CLUSTERING

(75) Inventors: Aner Ben-Artzi, Los Angeles, CA (US); Kirill Buryak, Sunnyvale, CA (US); Glenn M. Lewis, Costa Mesa, CA (US); Jun Peng, San Ramon, CA (US); Nadav Benbarak, Mountain View, CA (US)

(73) Assignee: Google Inc., Mountain View, CA (US)

( * ) Notice: Subject to any disclaimer, the term of this patent is extended or adjusted under 35 U.S.C. 154(b) by 14 days.

(21) Appl. No.: 13/021,278

(22) Filed: Feb. 4, 2011

(51) Int. Cl.
*G06F 7/00* (2006.01)
*G06F 17/00* (2006.01)

(52) U.S. Cl. ............. 707/736; 707/737; 706/45; 706/46
(58) Field of Classification Search .................... None
See application file for complete search history.

(56) References Cited

U.S. PATENT DOCUMENTS

| | | | | |
|---|---|---|---|---|
| 2004/0205217 A1* | 10/2004 | Gabrani et al. | ................ | 709/231 |
| 2006/0063156 A1* | 3/2006 | Willman et al. | .................. | 435/6 |
| 2009/0254971 A1* | 10/2009 | Herz et al. | .......................... | 726/1 |
| 2010/0332475 A1* | 12/2010 | Birdwell et al. | ............... | 707/737 |
| 2011/0173264 A1* | 7/2011 | Kelly | ............................ | 709/205 |
| 2011/0246465 A1* | 10/2011 | Koister et al. | ................. | 707/737 |

\* cited by examiner

*Primary Examiner* — Angelica Ruiz
(74) *Attorney, Agent, or Firm* — Brake Hughes Bellermann LLP (57) ABSTRACT

A number of levels of a cluster hierarchy may be determined, and a current level of the levels may be obtained by providing a current input to at least one clustering algorithm to thereby obtain a current output of the at least one clustering algorithm, where the current output includes a current plurality of clusters and defines the current level. Content information associated with each cluster of the current output from the at least one clustering algorithm may be aggregated to obtain aggregated content information for each cluster of the current output. The obtaining and the aggregating may be repeated, using the aggregated content information as the new current input, to thereby obtain a new current output defining a new current level during the obtaining, and using the new current output during the aggregating, until the new current level equals the number of levels.

20 Claims, 5 Drawing Sheets

IMPLICIT HIERARCHICAL CLUSTERING

TECHNICAL FIELD

This description relates to hierarchical clustering of content.

BACKGROUND

Current computer hardware resources and associated techniques provide for fast and efficient collection and storage of large amounts of data. However, it may be difficult for providers and consumers of such data to make optimal use of the information contained therein. For example, it may be difficult to discern patterns and relationships within and among the stored data.

Frequently, information within such data may be stored within discrete content files, e.g., text documents, image files, video files, or audio files. In such cases, use of the information stored within the various content files may be facilitated by clustering related content files within larger groups or sets of content files. For example, it may be useful to cluster groups of content files according to some shared characteristic, e.g., clustering content files based on a similarity of subject matter, similarity of source/origin, or virtually any other feature or characteristic of the content file which the user may wish to utilize as basis for grouping content files into clusters.

Accordingly, a number of conventional clustering algorithms are known which may be used to execute an automatic clustering of content files within a group of designated content files, e.g., based on a set of parameters or features provided by an operator of the clustering algorithm in question. In practice, however, such clustering algorithms may be insufficient to meet the needs of the user in accessing or otherwise utilizing the designated group of content files. Consequently, the user may fail to receive the full benefit of information available within the group of content files, and/or may fail to receive a desired access or other benefit within a desired timeframe. Thus, the utilization of the information stored within the content files may be suboptimal.

SUMMARY

According to one general aspect, a computer system may include instructions stored on a computer-readable medium and executable by at least one processor. The computer system may include a level manager configured to cause the at least one processor to determine a number of levels of a cluster hierarchy and to obtain a current level of the levels by providing a current input to at least one clustering algorithm to thereby obtain a current output of the at least one clustering algorithm, the current output including a current plurality of clusters and defining the current level. The system may include an aggregator configured to cause the at least one processor to execute an aggregating of content information associated with each cluster of the current output from the at least one clustering algorithm to obtain aggregated content information for each cluster of the current output. The level manager may be configured to use the aggregated content information as new current input and to thereby repeat the execution of the obtaining to obtain a new current output defining a new current level, and the aggregator may be configured to repeat the execution of the aggregating using the new current output, until the new current level equals the number of levels.

Implementations may include one or more of the following features. For example, the level manager may be configured to determine the number of levels including receiving the number of levels from a user by way of a graphical user interface, and/or including receiving a number of clusters to be generated at each level of the cluster hierarchy.

The level manager may be configured to receive a specified clustering algorithm of the at least one clustering algorithm to use at each level. The level manager may be configured to select a first clustering algorithm for determining the current plurality of clusters of the current level, and configured to select a second clustering algorithm for determining the new current plurality of clusters of the new current level.

The first current input to the at least one clustering algorithm may include a plurality of content files. The aggregator may be configured to execute the aggregating of content information including concatenating contents of content files within each cluster. The at least one clustering algorithm may be configured to calculate statistical information characterizing the plurality of content files to thereby execute clustering thereof. The aggregator may be configured to execute the aggregating of content information including concatenating the statistical information associated with each cluster.

According to another general aspect, a computer-implemented method may include executing instructions stored on a computer-readable medium. The method may include determining a number of levels of a cluster hierarchy, obtaining a current level of the levels by providing a current input to at least one clustering algorithm to thereby obtain a current output of the at least one clustering algorithm, the current output including a current plurality of clusters and defining the current level, aggregating content information associated with each cluster of the current output from the at least one clustering algorithm to obtain aggregated content information for each cluster of the current output, and repeating the obtaining and the aggregating, where the repeating may include using the aggregated content information as the new current input to thereby obtain a new current output defining a new current level during the obtaining, and using the new current output during the aggregating, until the new current level equals the number of levels.

Implementations may include one or more of the following features. For example, the determining the number of levels may include receiving a number of clusters to be generated at each level of the cluster hierarchy. The determining the number of levels may include receiving a specified clustering algorithm of the at least one clustering algorithm to use at each level.

The first current input to the at least one clustering algorithm may include a plurality of content files. The aggregating of content information may include concatenating contents of content files within each cluster. The at least one clustering algorithm may be configured to calculate statistical information characterizing the plurality of content files to thereby execute clustering thereof. The aggregating of content information may include concatenating the statistical information associated with each cluster.

According to another general aspect, a computer program product may be tangibly embodied on a computer-readable medium and may include executable code. When executed, the executable code may be configured to cause a data processing apparatus to determine a number of levels of a cluster hierarchy, obtain a current level of the levels by providing a current input to at least one clustering algorithm to thereby obtain a current output of the at least one clustering algorithm, the current output including a current plurality of clusters and defining the current level, aggregate content information associated with each cluster of the current output from the at least one clustering algorithm to obtain aggregated content information for each cluster of the current output, and repeat the obtaining and the aggregating, using the aggregated content information as the new current input to thereby obtain a new current output defining a new current level during the obtaining, and using the new current output during the aggregating, until the new current level equals the number of levels.

Implementations may include one or more of the following features. For example, The determining the number of levels may include receiving a number of clusters to be generated at each level of the cluster hierarchy. The determining the number of levels may include receiving a specified clustering algorithm of the at least one clustering algorithm to use at each level. The at least one clustering algorithm may be configured to calculate statistical information characterizing the plurality of content files to thereby execute clustering thereof, and the aggregating the content information may include concatenating the statistical information associated with each cluster.

The details of one or more implementations are set forth in the accompanying drawings and the description below. Other features will be apparent from the description and drawings, and from the claims.

DETAILED DESCRIPTION

Figure 1:
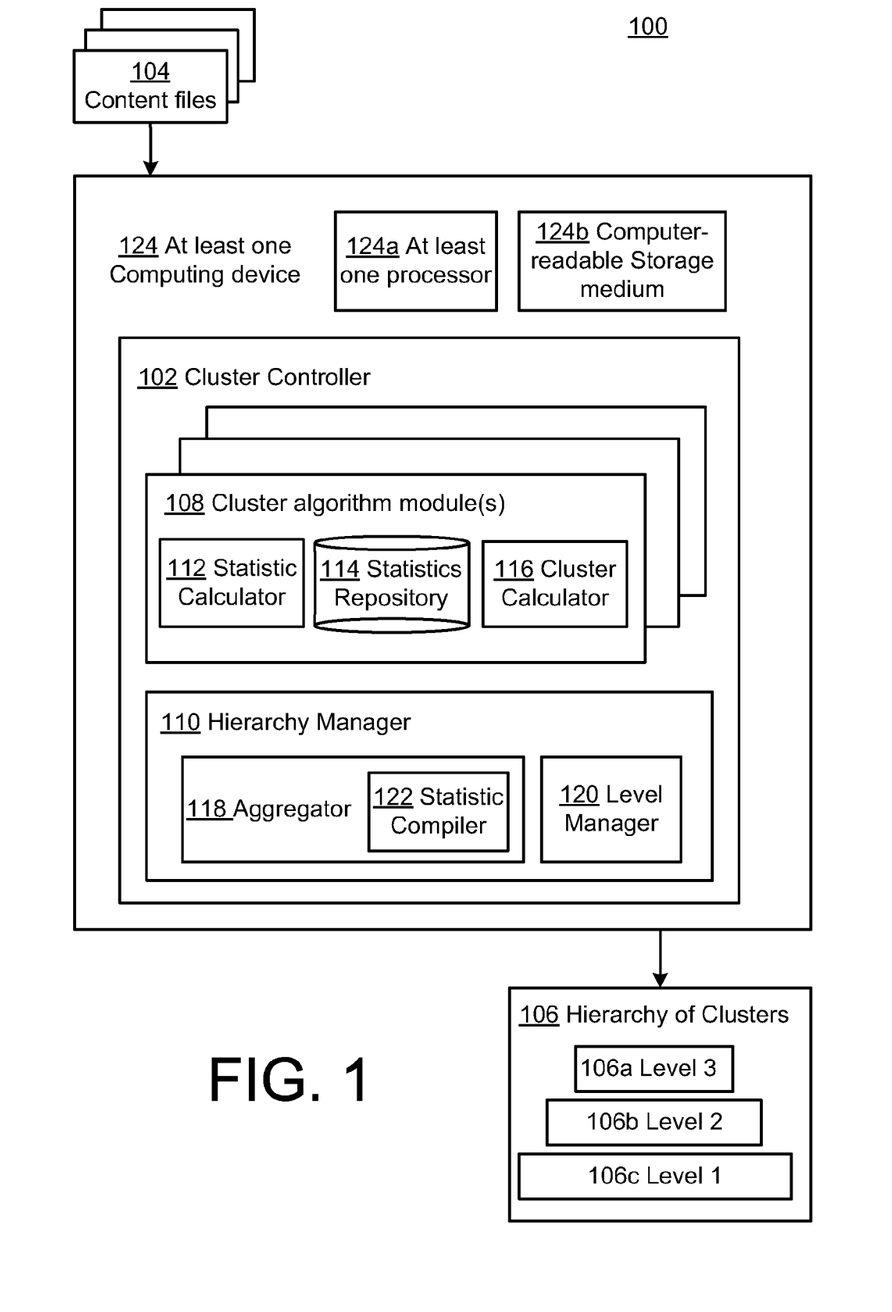
FIG. 1 is a block diagram of a system for providing implicit hierarchical clustering of a group of content files.

FIG. 1 is a block diagram of a system 100 for providing implicit hierarchical clustering of a group of content files. In the example of FIG. 1, a cluster controller 102 is configured to receive a plurality of content files 104, and to output a hierarchy of clusters 106. The hierarchy of clusters 106 includes a plurality of hierarchical levels, illustrated conceptually in the example of FIG. 1 as level 1 (106A), level 2 (106B) and level 3 (106C).

The hierarchy 106 thus includes a plurality of hierarchical levels of clusters, in which, in the example, a number of clusters at each level decreases inversely to the number of the corresponding level. That is, each level beyond the level 106A generally includes a clustering of clusters included within the immediately lower/preceding level, so that a number of clusters at each level decreases as the number of the corresponding level increases. Thus, the hierarchy 106 may serve to organize the content files 104 in a manner which facilitates a productive and efficient use thereof by the user of the system 100, as described in more detail below.

Specifically, as shown in the example of FIG. 1, the cluster controller 102 may include one or more cluster algorithms modules 108 which, as referenced above, may be configured to receive the content files 104 and to output resulting clusters of the content files 104. In other words, for purposes of this description, the cluster algorithm modules 108 may generally represent one or more conventional clustering algorithms. Consequently, it may be appreciated that such conventional clustering algorithms are well known in the art, and may include many various features and functions which are not described here in detail, except as where may be necessary or helpful in understanding operations of the system 100 of FIG. 1.

The cluster controller 102 may further include a hierarchy manager 110 which may be configured to parameterize and otherwise operate the one or more cluster algorithm modules 108 in order to provide the hierarchy of clusters 106. More specifically, as described in detail herein, the hierarchy manager 110 may be configured, e.g., to define a number of levels within the hierarchy of clusters 106, as well as to define a number of clusters at each level (and/or a number of content files within each cluster).

As further described herein, the hierarchy manager 110 may be configured to iteratively construct the hierarchy 106 by receiving an output of the one or more cluster algorithm modules, and thereafter transforming the received output into an input format which is compatible with subsequent input to the one or more cluster algorithm modules 108, to thereby obtain a subsequent level of the hierarchy of clusters 106. In other words, the hierarchy manager 110 may be configured to execute an iterative loop in which clusters that are output by the one or more cluster algorithm modules 108 are individually compiled or otherwise aggregated (i.e., on a cluster by cluster basis) and thereafter provided again to the cluster algorithm modules 108 for further clustering thereof. Thus, each output of the cluster algorithm module(s) 108 may be understood to represent a level of the hierarchy 106, and subsequent cluster-specific aggregation at each such level may be understood to represent a subsequent input to the one or more cluster algorithm modules 108 (to thereby obtain a following level of the hierarchy of clusters 106, and so on).

In this way, one or more otherwise conventional cluster algorithm modules 108 may be utilized to obtain a hierarchy of clusters 106 that is useful in facilitating a desired access to, or other use of, information contained within the content files 104. Moreover, as described, the cluster controller 102 provides for straightforward parameterization of the hierarchy 106.

For example, an operator of the system 100 may easily designate a number of levels 106A-106C . . . 106n of the hierarchy 106, simply by designating a corresponding number of times that the hierarchy manager 110 is configured to iteratively provide an output of the one or more cluster algorithm modules 108 to an input thereof. Further, an operator of the system 100 may designate a number of clusters at each level of the hierarchy 106, because specification of a number of clusters to be output by clustering algorithms is a known parameter of most or all conventional clustering algorithms.

Thus, in practice, it may occur that the content files 104 initially include 100,000 individual content files (e.g., text based documents). In this case, the first level 106A of the hierarchy 106 may be constructed by the cluster controller 102 so as to include 1000 clusters, each such cluster containing however many of the 100,000 content files are included therein (according to an underlying parameterization of the cluster algorithm module 108 used to construct the first level 106A).

Meanwhile, the second level 106B of the hierarchy 106 may include 100 clusters, where, as referenced above, each of the 100 clusters includes a number of clusters of the underlying 1000 clusters that is dictated by parameterization of the cluster algorithm module 108. Similarly, in the example, the third and final level 106C may include 10 clusters, each of which may contain a number of clusters of the underlying 100 clusters included in the second level 106B.

As described in detail herein, an output of the one or more cluster algorithm modules 108 thus serves as both a level of the hierarchy 106, and as a subsequent input to the one or more cluster algorithm modules 108 for obtaining a subsequent/higher level of the hierarchy 106. In this way, the cluster controller 102 may operate to provide the hierarchy of clusters 106 using otherwise conventional clustering algorithms, without requiring significant additional expertise on the part of the operator of the system 100 (beyond that which is necessary for operation of the otherwise clustering algorithms themselves). Other features and advantages of the system 100 of FIG. 1 are described in more detail, below.

In the example of FIG. 1, the one or more clustering algorithm modules 108 are illustrated as including a number of illustrative subcomponents representing conventional functionalities of the clustering algorithm module(s) 108 in performing clustering of the content files 104. In particular, as shown, the clustering algorithm module 108 may include a statistic calculator 112 which may be configured to receive the content files 104 and to determine a number of statistical measures or other characterizations of the content thereof.

For example, the statistic calculator 112 may compute a number of times that a particular word or phrase appears within each of the content files 104. In another example, the statistic calculator 112 may compute a number or frequency of words and phrases which are determined to have a similar semantic meaning. In still other examples, the statistic calculator 112 may compute measures of various types of metadata related to each content file, rather than, or in addition to, computing statistical characterizations of the content itself. For example, the statistic calculator 112 may compute a number of times that the content files are retrieved from a database, or may calculate information characterizing a source of each content file, e.g., a physical location of storage from which the content files are retrieved, or referring to an identity of an author of each content file. Other examples of calculated statistics are known, or would be apparent.

In conventional clustering algorithms, the selection, definition, and parameterization of such statistical calculations may be known as feature selection, i.e., may refer to a specification of such features or other characteristics which an operator of the clustering algorithm may wish to include as part of the basis for executing the clustering of the content files 104 in question. As is known, specification of such features for a statistical characterization thereof may vary widely depending on circumstance and on preference of individual operators of the system 100. Moreover, different clustering algorithms may be designed to function optimally for specific types of features.

In many of the examples that follow, the content files 104 are discussed as including text-based documents. In such examples, the statistic calculator 112 may be configured to calculate various statistical measures regarding the text within such documents, as described in detail herein. Of course, as otherwise described herein, the content files 104 are not limited to text-based documents, and may include image files, video files, audio files, or virtually any other type of digital media used to store information, or combinations thereof.

During operation, the statistic calculator 112 may be configured to store calculated statistics within a statistics repository 114. For example, in the examples just referenced in which the content files 104 include text-based documents, the statistic calculator 112 may receive each document, and may calculate a number or frequency of specified words, phrases, or other content for the received document. Then, the thus-calculated statistical information for the document in question may be stored in relation to the document within the statistics repository 114. Subsequently, the process of calculating and storing such statistics may be repeated for each of the documents within a specified group of content files, until statistical information for each document is available within the statistics repository 114.

Once the statistics repository 114 is sufficiently completed, a cluster calculator 116 may be configured to utilize the storage statistics to group clusters of the content files 104. Specifically, as referenced above, an operator of the system 100 may parameterize the cluster algorithm module 108 *b* providing or selecting desired features which characterize the clustering operations of the cluster algorithm module 108. Such feature selection was described above with respect to operation of the statistic calculator 112, and the same, similar, additional, or alternative features may serve as basis for the clustering operations of the cluster calculator 116.

For example, in the example scenarios referenced above in which the content files 104 include text based documents, then statistics within the statistics repository 114, as described above, may characterize a number and/or frequency of specified words, phrases, or concepts. Then, the cluster calculator 116 may utilize the statistics in clustering the underlying content files 104 (e.g., text documents). For example, the cluster calculator 116 may include all content files containing a specified word a certain number of times or at a certain frequency within a first cluster, and may include other ones of the content files which contain a different word at the specified number of frequency within a second cluster. Additionally, or alternatively, the cluster calculator 116 may group clusters of the content files 104 based on, e.g., an author of the content file, a number of times each content file has been previously accessed, or on virtually any other characterization of the content file or characteristic of the content files 104.

Thus, the cluster algorithm module 108 may initially input the content files 104, and may output a plurality of clusters of the content files 104. The thus obtained plurality of clusters, as described above, may thus form a level of the hierarchy 106.

At the same time, the hierarchy manager 110 may be configured to render each cluster (and/or information associated with each cluster) suitably for subsequent provision thereof to the cluster algorithm module 108. In this way, the cluster algorithm module 108 may provide an additional or further clustering of the previously obtained clusters for the previous level of the hierarchy 106, so as to thereby provide a further plurality of clusters which form a next-higher level of the hierarchy of clusters 106. As described, this iterative process of feeding an output of the cluster algorithm module 108 to an input thereof may continue until a desired number of levels of the hierarchy of levels 106 have been obtained.

Thus, as shown, the hierarchy manager 110 may include an aggregator 118 which is configured to compile, integrate, concatenate, or otherwise aggregate content (and/or information characterizing the content) of each cluster of the plurality of clusters included within a given output of clusters of the cluster algorithm module 108. In this way, the aggregator 118 may be configured to translate, reformulate, or otherwise render information within or about each cluster in a format which is compatible for further processing (i.e., clustering) by the cluster algorithm module 108.

As shown, the hierarchy manager 110 may further include a level manager 120 which is configured to utilize operations of the aggregator 118 in conjunction with the cluster algorithm module 108 to construct the hierarchy 106. In this regard, and as explained in more detail herein, the level manager 120 may be configured, e.g., to designate a number of levels of the hierarchy 106 (e.g., a number of levels desired by an operator of the system 100), and to characterize or parameterize each such level in a desired manner.

Further, the level manager 120 may be configured to manage operations of the aggregator 118 to achieve the desired hierarchy 106. For example, the level manager 120 may be configured to instruct the aggregator 118 as to a number of times necessary to aggregate output of the cluster algorithm module 108 for providing resulting aggregated information back to the inputs of the clustering algorithm module 108. Other examples and details regarding operations of the level manager 120 are provided below.

Specifically, and continuing the example above in which the content files 104 include text documents, and as described above, the cluster algorithm module 108 may be configured to receive the documents and to output clusters thereof. Then, as instructed by the level manager 120, the aggregator 118 may be configured to receive each cluster of the plurality of the clusters output by the cluster algorithm module 108, and to aggregate the content (or information characterizing the content) of each cluster, so as to thereby render such information in a manner suitable for providing to the input of the cluster algorithm module 108.

As in the example above, it may be appreciated that during such operations, 100,000 documents within the content files 104 may initially be clustered by the cluster algorithm module 108 into 1000 clusters. For the sake of example, it may occur, then, that each of the 1000 clusters contains 100 of the 100,000 documents. Then, the aggregator 118 may be configured to input each cluster of the 1000 clusters, and to aggregate each of the included 100 documents. For example, in the scenario in which the content files 104 included text documents, such aggregation may include concatenation of all the text of the 100 documents of each cluster of the 1000 clusters. By virtue of such concatenation, the aggregator 118 may effectively provide a text document which, for intents and purposes of the cluster algorithm module 108, may serve as an otherwise conventional input thereto.

Thus, in the example, the cluster algorithm module 108 may proceed with clustering, effectively, 1000 documents. Consequently, it may be appreciated that the cluster algorithm module 108 may operate in a substantially conventional manner, i.e., may operate substantially in the same manner as during the initial/previous iteration in which the content files 104 were previously clustered. As a result, the cluster algorithm module 108 may output a subsequent plurality of clusters to thereby form a subsequent, corresponding level of the hierarchy 106. In the example, the 1000 documents (i.e., the 1000 concatenations of each underlying cluster of 100 documents) may be further clustered into 100 clusters, each containing 10 underlying clusters, each of which itself contains 100 documents. Thus, in the example, the 100 clusters may be observed to contain, directly or indirectly, 1000 of the initial set of 100,000 content files 104.

This process may then be repeated for yet a further clustering by the cluster algorithm module 108. In the example, the cluster algorithm module 108 may receive concatenated versions of documents within each of the 100 clusters, and may thereby operate in an otherwise conventional manner to cluster the concatenated documents, e.g., to thereby obtain a third level of the hierarchy 106 containing 10 clusters. In this way, the hierarchy 106 may be formed as including a decreasing number of clusters at each level 106A-106C of the hierarchy 106. As described, by performing such hierarchical clustering, an operator of the system 100 may be provided with an ability to access information within the content files in a fast and accurate manner, and to perceive patterns of information within the content files 104.

In the simplified examples referenced above in which the content files 104 include text based documents, the aggregator 118 is described as aggregating content of each cluster of a current level of the hierarchy 106 by concatenating text from each document within a cluster to thereby form a single super document. However, it may be appreciated that such examples are provided for illustrating a simplified, conceptual example operation of the aggregator 118, and that many other variations and optimizations of aggregating operations of the aggregator 118 may be used instead.

For example, continuing the example in which the content files 104 include text based documents, the above description gives examples of operations of the statistics calculator 112 in compiling statistics for each text document, and thereafter storing such statistics within the statistics repository 114. As described in the examples, the cluster calculator 116 may thereafter determine clusters to be output from the cluster algorithm module 108 based on the statistics from the statistics repository 114.

Consequently, the aggregator 118 may include a statistics compiler 122 which may be configured to directly compile or otherwise aggregate statistics within the statistics repository 114 to thereby obtain appropriate input for the cluster calculator 116 in calculating a higher level of clusters for the hierarchy 106.

For example, in a simplified scenario in which the content files 104 include text documents which are initially analyzed by the statistics calculator 112 to determine corresponding statistics therefore, such as, e.g., a calculated number or frequency of selected words, phrases, or content, it may occur that the cluster calculator 116 operates to group two particular documents within a single cluster output from the cluster algorithm module 108. Subsequently, rather than concatenate the actual content of these two text documents, the statistics compiler 122 may compile the statistics associated with the two documents within the statistics repository 114.

For example, the statistics calculator 112 may determine that a first document includes a given word 100 times, and determines that a second document includes the given word 50 times. Then, the statistics compiler 122 may determine that the cluster which includes the two documents includes the given word a total of 150 times. This information may be reflected within the statistics repository 114, e.g., by storing the compiled statistics in association with the cluster containing the two documents. In other words, for example, the statistics repository 114 may be used in a substantially conventional manner, except that, e.g., the statistics repository 114 may store statistics for a cluster of documents as a whole, rather than storing statistics individually for each underlying document.

The above description provides many examples of operations, features, and functions of the system 100 of FIG. 1. Nonetheless, it may be appreciated that the system 100, and similar systems, may include or be associated with many other variations and implementations. For example, in a simplified operation of the system 100, the hierarchy manager 110 may use a single cluster algorithm module 108 to construct each level of the hierarchy 106. In such examples, the single cluster algorithm module 108 may be parameterized consistently for each level 106A-106C. That is, for example, the selected cluster algorithm module 108 may be associated with the same feature selection and other statistic characteristics during calculation of each level of the hierarchy 106.

In other example scenarios, however, the hierarchy manager 110, e.g., the level manager 120, may select a different cluster algorithm module 108 for different levels of the hierarchy 106. Somewhat similarly, the level manager 120 may be configured to utilize different feature selections and associated statistical calculations for each level of the hierarchy 106, when using either the same or different cluster algorithm module 108. Various other additional or alternative implementations and operations of the system 100 of FIG. 1 are described herein, or would be apparent to one of skill in the art.

In the example of FIG. 1, the cluster controller 102 is illustrated as executing on at least one computing device 124, which may include or be associated with at least one processor 124A and a computer readable storage medium 124B. Again, however, it may be appreciated that many various configurations of the system 100 may be implemented beyond the examples illustrated and described with respect to FIG. 1.

For example, it may occur that different elements of the cluster controller 102 are executed using different computing devices (e.g., a remote computer and a local computer which are connected by a particular network). In other examples, elements and components of the system 100 which are illustrated singularly may be implemented using two or more separate subcomponents. Conversely, elements and components illustrated separately from one another may be executed within a single module. These and other configurations of the system 100 may be understood to represent matters of design choice that would be apparent to one of skill in the art, and therefore are not discussed herein in further detail, except as may be necessary or helpful in understanding operations of the system 100 of FIG. 1.

Figure 2:
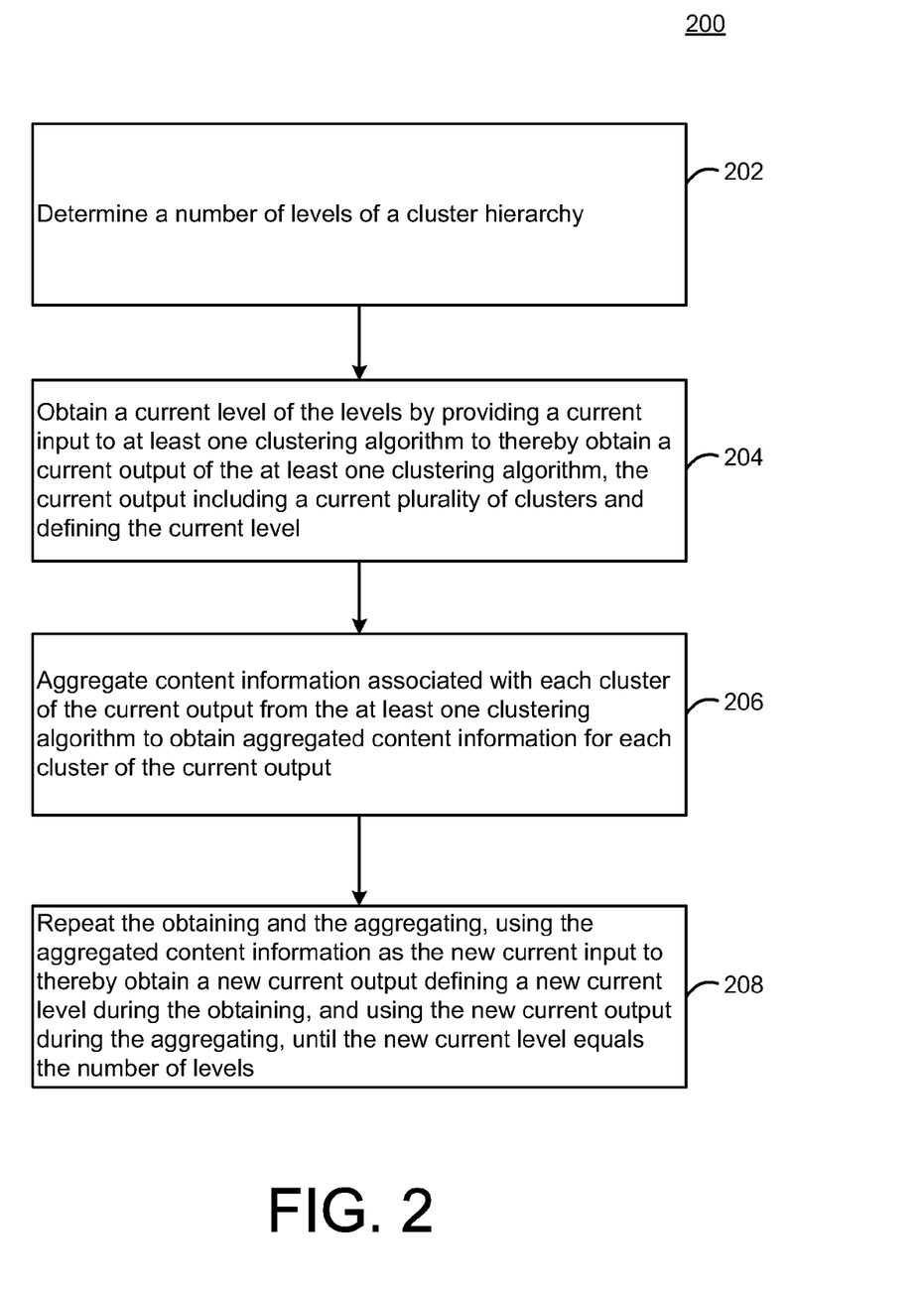
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated in sequential order. However, it may be appreciated that the flowchart 200 illustrates non-limiting examples of operations of the system 100 of FIG. 1. For example, two or more operations of the operations 202-208 may be executed in a partially or completely overlapping or parallel manner. In other examples, operations may be performed in a different order than that shown. Further, additional or alternative operations may be included.

In the example of FIG. 2, a number of levels of a cluster hierarchy may be determined (202). For example, the level manager 120 may be configured to receive a number of levels 106A-106C of the hierarchy 106. For example, the level manager 120 may receive the designated number of levels to be included in the hierarchy 106 from the user of the system 100, e.g., by way of a graphical user interface (GUI) having appropriate text entry fields for entering a desired number of levels.

As described herein, additional information related to the hierarchy 106 also may be received in conjunction with the determination of the number of levels 106A-106C of the hierarchy 106. For example, the user of the system 100 may further specify a number of clusters to be included/created at each of the levels 106A-106C. Further, the user may designate a particular cluster algorithm module 108 or used in executing clustering with respect to some or all of the levels 106A-106C, i.e., may specify a particular cluster algorithm module 108 for each level, or may designate a single cluster algorithm module 108 for all of the levels 106A-106C. In still further examples, the user may designate, using the level manager 120, particular parameters for feature selection and/or statistic calculation that are to be associated with each or all of the levels 106A-106C.

A current level of the levels may be obtained by providing a current input to at least one clustering algorithm to thereby obtain a current output of the at least one clustering algorithm, where the current output includes a current plurality of clusters and defines the current level (204). For example, in an initial iteration of the flowchart 200, the current input may include the plurality of content files 104 which are provided by the hierarchy manager 110 to the cluster algorithm module 108, to thereby obtain a resulting set of clusters thereof, thereby defining the first level 106A of the hierarchy 106.

Content information associated with each cluster of the current output from the at least one clustering algorithm may be aggregated to obtain aggregated content information for each cluster of the current output (206). For example, the aggregator 118 may aggregate content information for each cluster at the first level 106A. For example, as described, such aggregation may include aggregation of actual content of content files within each cluster (e.g., concatenation of text within the content files of each cluster), or may include information characterizing the content. For example, as also described, the statistics compiler 122 may be configured to execute the aggregation by compiling statistics or all content files of a given cluster to serve as the aggregated content information.

The obtaining and the aggregating may be repeated, using the aggregated content information as the new current input to thereby obtain a new current output defining a new current level during the obtaining, and using the new current output during the aggregating, until the new current level equals the number of levels (208). For example, the hierarchy manager 110 may obtain the aggregated content information for the various clusters of the first level 106A, so that the thus obtained aggregated content information may serve as the new current input to the cluster algorithm module 108, which may thus output resulting clusters defining the new current level, i.e., the second level 106B.

Thereafter, a third iteration may be executed in which aggregated content information is obtained for each cluster of the second level 106B, and used as the new current input to the cluster algorithm module 108 to thereby obtain the next level 106C. In the example, a number of levels initially designated may be three, so that, after the third iteration, the new current level 106C equals the originally designated three levels, so that the operations 202-208 of the flowchart 200 may complete.

Figure 3:
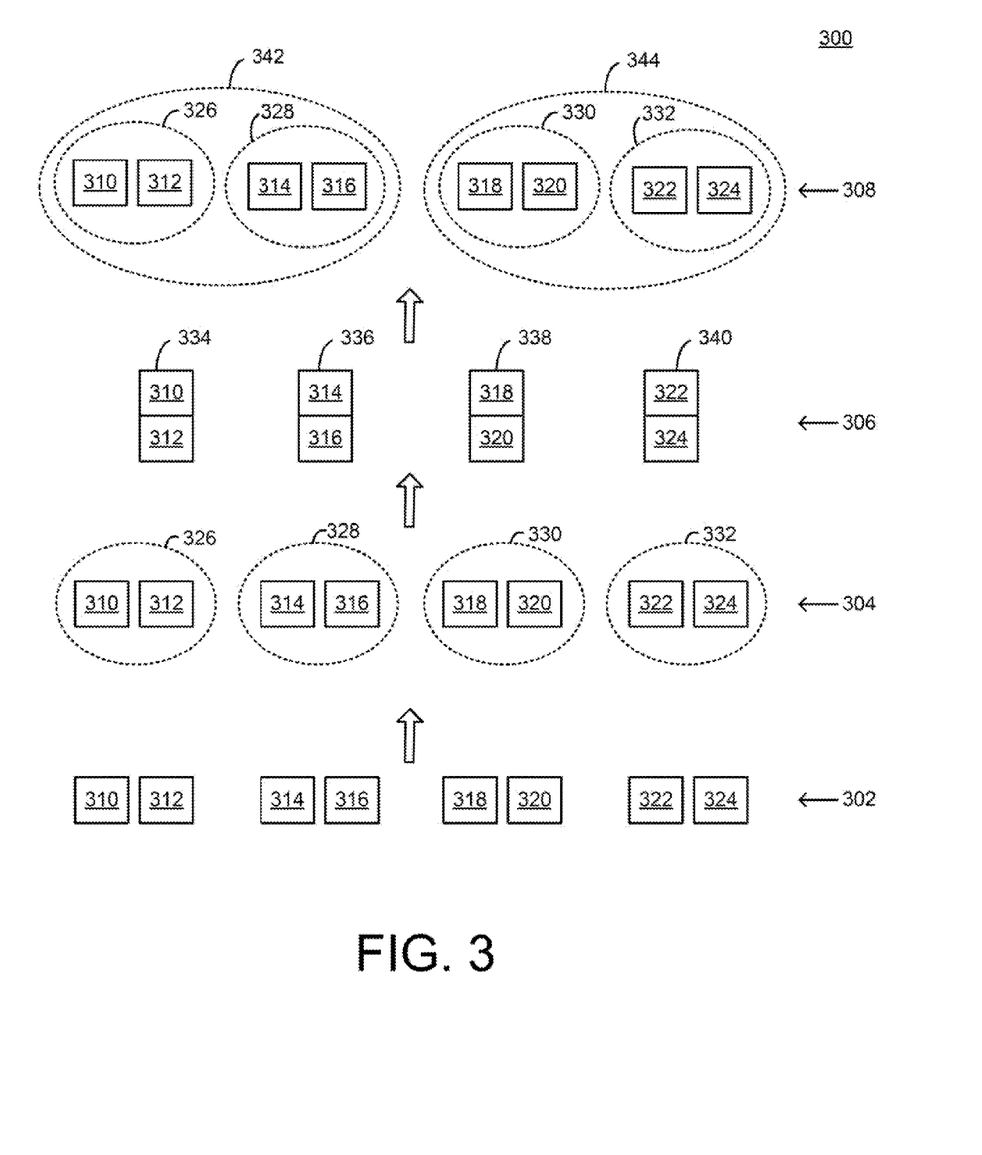
FIG. 3 is a block diagram illustrating an example hierarchical clustering of documents using the system of FIG. 1.

FIG. 3 is a block diagram illustrating an example of hierarchal clustering using the system 100 of FIG. 1. In the example of FIG. 3, a plurality of content files 302 are illustrated which may be understood to be analogous to the content files 104 of FIG. 1. As described in detail below, the content files 302 may be clustered to form a level 304 of a cluster hierarchy, such as the cluster hierarchy 106 of FIG. 1. Subsequently, the clusters of the level 304 may have content information aggregated for each cluster to obtain aggregated content information 306. Finally in FIG. 3, the aggregated content information may be used to execute further clustering to thereby obtain a second level 308 of a cluster hierarchy.

In more detail, the content files 302 may include a plurality of text based documents 310-324, as shown. To give a specific example, it may occur that a user of the system 100 has previously solicited feedback from users of a graphical user interface which the operator of the system 100 wishes to evaluate and improve. Thus, the content files 310-324 may each represent separate documents obtained from the users of the graphical user interface, and may each contain feedback from each user regarding the graphical user interface.

In the example, the operator of the system 100 may wish to cluster the documents 310-324 based on some initial clustering criteria and associated selected features to obtain the level 304. For example, the operator may cluster the documents 310-324 based on such meta information as a source or origin of a given document, or based on a time of collection of a given document. The operator may execute clustering based on particular words, phrases, or concepts contained within each document 310-324, such as, e.g., whether the documents include positive or negative feedback regarding the graphical user interface.

Subsequently, the user may wish to form the second level 308 of the cluster hierarchy by clustering the aggregated content information 306 based on specific characteristics and desired feedback associated with the graphical user interface. For example, the operator of the system 100 may wish to have a first cluster which includes feedback related to an aesthetic or visual appearance of the graphical user interface, while having a second cluster related to substantive review(s) of content and functionality associated with the graphical user interface.

Thus, with reference to FIGS. 1 and 2, it may be appreciated that an operator of the system 100 may initially proceed by designating the documents 310-324 for clustering. The operator may utilize the level manager 120 to designate the operator desired for two levels (i.e., the levels 304, 308), to be included within the cluster hierarchy. The operator may further specify a desire for a certain number of clusters at each level 304, 308. In other examples, the operator may obtain similar results by specifying different parameters, e.g., by specifying a designated maximum number or minimum number of documents to be included within each cluster of a given level, without necessarily limiting the number of clusters at that level.

The operator may further designate desired results by specifying cluster algorithm modules 108 and/or associated feature selections of the one or more selected cluster algorithm modules, in order to obtain the results referenced above. In other words, for example, the operator of the system 100 may obtain desired results by utilizing a single cluster algorithm module 108 to determine the two cluster levels 304-308, and/or by designating corresponding appropriate feature selections for use by the cluster algorithm module. In additional or alternative examples, the operator of the system 100 may simply use a different cluster algorithm module for each of the two desired levels 304, 308.

In operation, then, the level manager 120 may initially provide the documents 310-324 to the appropriate cluster algorithm module 108. As described above, the statistic collector 112 may collect designated statistics regarding each of the documents 310-324 for storage thereof within the statistics repository 114. Using this information, the cluster calculator 116 may output clusters 326, 328, 330, and 332, to thereby form the level 304 of the hierarchy. FIG. 3 illustrates a simplified example in which the cluster 326 includes documents 310, 312, the cluster 328 includes 314, 316, the cluster 330 includes the documents 318, 320, and the cluster 332 includes the documents 322, 324.

Subsequently, as referenced above and described herein, the aggregator 118 may be configured to aggregate content information associated with content of the documents contained within each cluster 326-332. For example, with reference to the cluster 326, the aggregator 118 may be configured to obtain aggregated content information for the included documents 310, 312. In the example of FIG. 3, aggregated content information 334 is illustrated as an aggregation of content information associated with documents 310, 312.

As referenced above, the aggregated content information 334 may include an aggregation of the actual content 310, 312. For example, in the case where the documents 310, 312 include text, the aggregated content information 334 may include a concatenation of the text of the documents 310, 312.

In other examples, however, as also described above, the aggregated content information 334 may include a compilation of the statistics associated with the document 310 together with statistics calculated for the document 312. In other words, as described, the statistics compiler 322 may be configured to compile statistics for the documents 310, 312 from the statistics repository 114 to thereby obtain the aggregated content information 334. As may be appreciated, it may be more efficient for the aggregator 118 to utilize the statistics compiler 122 to directly aggregate statistical information within the statistics repository 114, e.g., to thereby reduce or eliminate redundant efforts in determining the statistics from a concatenated or otherwise aggregated version of the document 310, 312.

Similarly, the aggregator 118 and/or the statistics compiler 122 may be configured to obtain aggregated content information 336 associated with the documents 314, 316 of the cluster 328. Further, aggregated content information 338 may similarly be obtained for the documents 318, 320 of the cluster 330, while aggregated content information 340 may be obtained for the documents 322, 324 of the cluster 332.

As described herein, regardless of whether the aggregated content information 334-340 includes actual content of the underlying content files, statistical information regarding the content, or other information related to the content, the aggregated content information is of a form which is suitable for input to the one or more cluster algorithm modules 108.

Specifically, in the example where the documents 310-324 include text, it may be appreciated that the resulting aggregated content information 334-340 may include concatenated content (e.g., text) suitable for input to the statistics calculator 112, or, in other described examples the aggregated content information 334-340 may include compiled statistics regarding the corresponding underlying documents, which are directly suitable for input to the cluster calculator 116. Consequently, the cluster calculator 116 may be configured to utilize the aggregated content information 334-340 to calculate clusters 342, 344 of the level 308 of the resulted cluster hierarchy.

As shown and described, it may be appreciated that the cluster 342 at the higher/second level 308 includes underlying clusters 326-328, which themselves include documents 310/312 and 314/316, respectively. Similarly, the cluster 344 includes underlying clusters 330, 332 which themselves include documents 318/320 and 322/324, respectively, as shown. Thus, it may be appreciated that the cluster levels 304 and 308 provide an organization of underlying documents 310-324 and information contained therein, in a manner which facilitates access to, and use of, the documents and associated information by operator of the system 100.

For example, in the user feedback scenario referenced above, it may be straightforward for an operator of the system 100 to first select the cluster 342 as including information pertinent to a visual layout of the graphical user interface on which the feedback has been solicited. From there, the operator of the system 100 may further select included clusters which are related to certain types of feed back, (e.g., positive or negative), or any other characteristic used to execute the clustering of the documents 310-324 to obtain the level 304.

Consequently, it may be straightforward for the operator of the system 100 to locate a desired type of information within the hierarchy. At the same time, it may be possible for the operator of the system 100 to discern patterns, trends, or other meta information about the, in this example, user feedback. For example, the operator may notice that a large majority of the documents (i.e., user feedback) fall into the cluster 342 at the level 308 which is related to a visual layout of the graphical user interface, while only a small minority of the user feedback is included within the cluster 344 of the level 308 associated with substantive feedback regarding content or function of the graphical user interface. Then, the operator of the system 100 may focus efforts accordingly when responding to the user feedback (e.g., when seeking to improve the underlying graphical user interface).

Of course, as may be appreciated from the above description, the specific example given with respect to FIG. 3 should be considered to be non-limiting with respect to operations of the system 100. For example, the content files 310-324 may include image files. In such examples, the aggregated content information 334-340 may include tiled images of the images within the corresponding underlying content files, and/or may include meta data for each corresponding image file.

Figure 4:
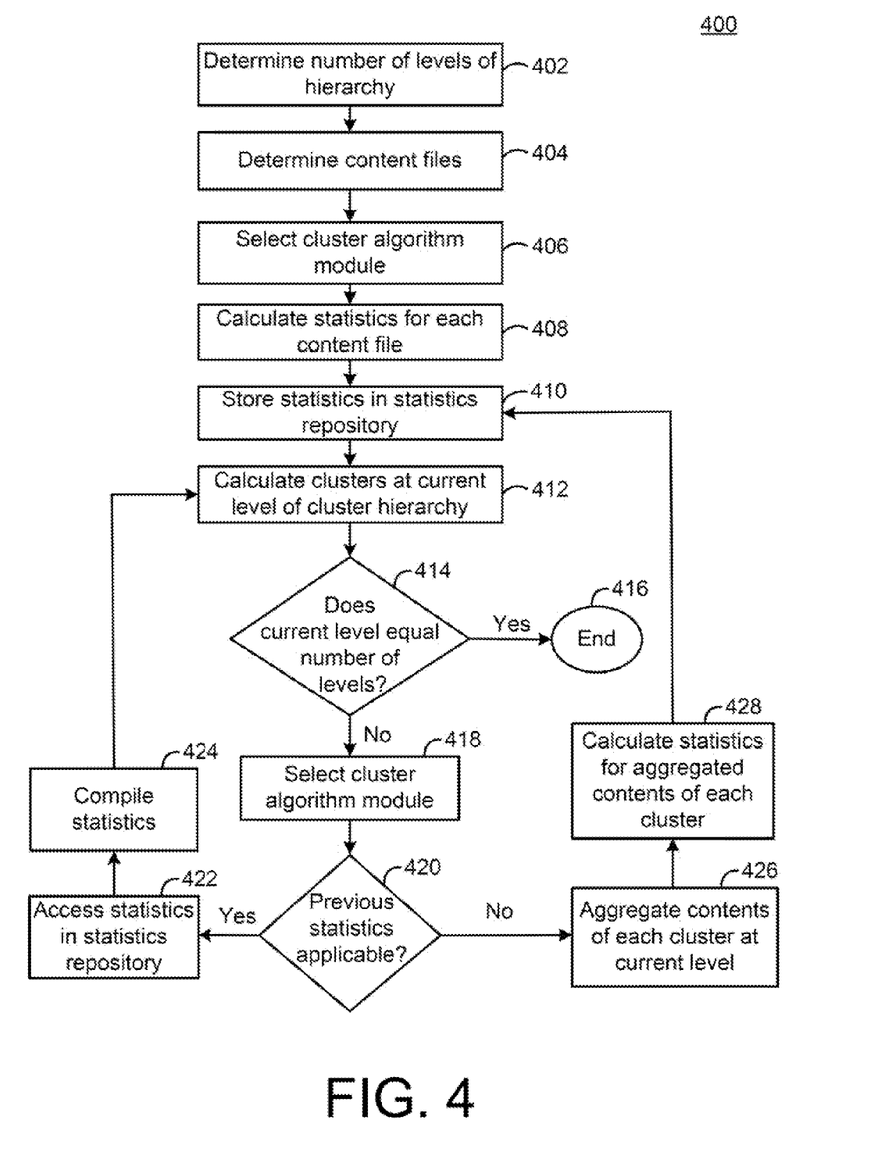
FIG. 4 is a flowchart illustrating more detailed example operations of the system of FIG. 1.

FIG. 4 is a flowchart 400 illustrating more detailed examples of the operations of the system 100 of FIG. 1. In the example of FIG. 4, a number of levels of a cluster hierarchy may be determined (402). For example, an operator of the system 100 may input a desired number of levels of the hierarchy using the level manager 120. In the example of FIG. 3, as just described, the number of levels may equal two (i.e., the levels 304, 308).

Subsequently, content files to be clustered may be determined (404). For example, as just described, the content files may include the documents 310-324.

An appropriate cluster algorithm module may be selected for execution of clustering of the content files to produce an initial level of the hierarchy as a current level (406). For example, the level manager 120 may select one of the cluster algorithm modules 108 in accordance with instructions from the operator.

Statistics for each content file may be calculated (408). For example, the statistics calculator 112 may calculate statistics regarding unique words, phrases, or other content within each of the documents 310-324, and may thereafter store such statistics within the statistics repository 114 (410).

Clusters at the current level of the cluster hierarchy may then be calculated (412). With reference to the example of FIG. 3, for example, the first/initial level 304 may be calculated as the current level and determined to include the clusters 326-332, as described above.

If the current level of the hierarchy equals the originally-designated number of levels (414), then the process 400 may end (416). If, however, as in the example of FIG. 3, the current level does not yet equal the designated number of levels (414), then the process may proceed with selection of the same or different cluster algorithm modules 108 (418), in accordance with instructions from the operator of the system 100.

Subsequently, a determination may be made by the aggregator 118 as to whether the previously calculated and stored statistics remain applicable (420). In other words, the aggregator 118, considering the existing selection of the designated cluster algorithm module and/or associated feature selection, may determine whether the statistics within the statistics repository 114 are suitable for proceeding with obtaining the aggregated content information for input to the currently-selected cluster algorithm module 108.

If so, then the statistics compiler 122 may access the corresponding statistics within the statistics repository 114 (422), and may proceed with compiling the determined statistics (424). Subsequently, the cluster calculator 116 may proceed with calculating the next level (i.e., the second level 308), as the new current level of the cluster hierarchy (412). In the example, this new current level equals the originally-designated number of levels (414), so that the process 400 may end (416).

However, as described herein, it may occur that previous statistics are not applicable for execution of the designated cluster algorithm module and associated feature selection to be used for calculating a next/new current level of the hierarchy (420). For example, with respect to determining aggregated content information for audio files, it may be difficult to utilize previously compiled statistics for the audio files to calculate further clusters thereof at the next/second level of the cluster hierarchy.

In this case, a separate process flow is illustrated in which the contents of each cluster are aggregated as such at the current level (426). Again with reference to the example of FIG. 3, such a process flow would indicate that the aggregated content information 334-340 each includes aggregated contents of corresponding underlying content files. Of course, operation 426 is merely an example, and other techniques may be employed for calculating aggregated content information when some or all of the previously calculated and stored statistics are not suitable for direct compilation and input to the cluster calculator 116. In the example of FIG. 4, however, the process continues with calculation of statistics for the aggregated contents of the content files of each cluster (428), whereupon the newly calculated statistics may be stored within a statistics repository 114 (410).

Then, again, as described above, operations may proceed with calculation of the current (i.e., second) level of the cluster hierarchy (412). As described, in the example, this current level in fact equals the originally-designated number of levels (414), so that the process 400 may complete.

As described herein, a single (flat) level of clustering may not be sufficient to describe the structure and interrelationships of the included content. A hierarchical set of clusters (e.g., clusters of clusters) may be useful to allow for improved access and comprehension of the data. However, such techniques may rely on different algorithms and assumptions about the data as compared to an appropriately chosen flat clustering method. In addition, many flat clustering methods are available, and therefore it is likely that an implementation of such a method will be found that is very well suited for the data characteristics of a particular implementation. This present description thus provides techniques for utilizing existing or new flat clustering methods to generate a hierarchy of clusters, thus making hierarchical clustering available to problems which hitherto only had meaningful clustering solutions under flat clustering methods.

Figure 5:
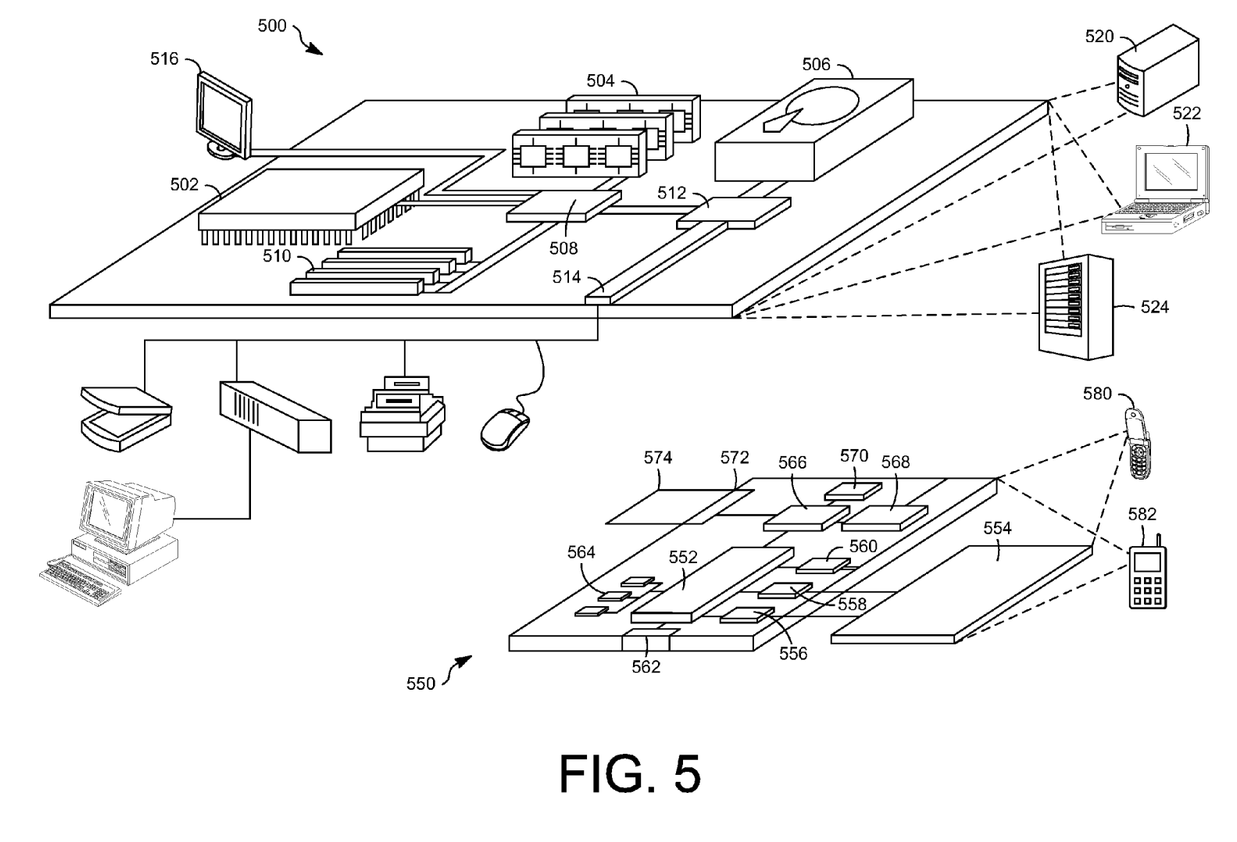
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer system including instructions stored on a computer-readable medium and executable by at least one processor, the computer system comprising:
    a level manager configured to cause the at least one processor to:
        determine a number of levels of a cluster hierarchy, and generate a level of the cluster hierarchy by:
            providing a current input to a clustering algorithm, and
            obtaining a current output of the clustering algorithm, the current output including a current plurality of clusters,
        wherein the current output defines the level; and
    an aggregator configured to cause the at least one processor to execute an aggregating of content information associated with each cluster of the current output to obtain aggregated content information for each cluster of the current output, wherein the level manager is further configured to repeat the generating to generate a new level of the cluster hierarchy until the new level equals the number of levels by:

using the aggregated content information as new current input for the clustering algorithm, obtaining a new current output defining the new level, and when the new level is not equal to the number of levels, causing the aggregator to repeat the execution of the aggregating using the new current output, to obtain new aggregated content information for each cluster of the new current output to be used as new current input.

2. The system of claim 1, wherein as part of determining the number of levels, the level manager is configured to receive the number of levels from a user by way of a graphical user interface.

3. The system of claim 1, wherein as part of determining the number of levels, the level manager is configured receive a number of clusters to be generated at each level of the cluster hierarchy.

4. The system of claim 1, wherein the level manager is configured to receive a specified clustering algorithm for each level of the cluster hierarchy for use as the clustering algorithm.

5. The system of claim 1, wherein the level manager is configured to select a first clustering algorithm for obtaining the current output, and configured to select a second clustering algorithm for obtaining the new current output.

6. The system of claim 1, wherein the first current input to the clustering algorithm includes a plurality of content files.

7. The system of claim 6, wherein as part of aggregating of content information, the aggregator is configured to concatenate contents of content files within each cluster.

8. The system of claim 6, wherein the clustering algorithm is configured to calculate statistical information characterizing the plurality of content files to thereby execute clustering thereof.

9. The system of claim 8, wherein as part of aggregating of content information, the aggregator is configured to concatenate the statistical information associated with each cluster.

10. A computer-implemented method including executing instructions stored on a computer-readable medium, the method comprising:

determining a number of levels of a cluster hierarchy;
generating a level of the cluster hierarchy by:
providing a current input to a clustering algorithm, and
obtaining a current output of the clustering algorithm, the current output including a current plurality of clusters,
wherein the current output defines the level;
aggregating content information associated with each cluster of the current output from the clustering algorithm to obtain aggregated content information for each cluster of the current output; and
repeating, until the new level equals the number of levels:
the generating to generate a new level of the cluster hierarchy by using the aggregated content information as new current input to the clustering algorithm to obtain a new current output defining the new level of the cluster hierarchy, and
the aggregating using the new current output, when the new level is not equal to the number of levels.

11. The method of claim 10 wherein the determining the number of levels includes receiving a number of clusters to be generated at each level of the cluster hierarchy.

12. The method of claim 10 wherein the determining the number of levels includes receiving a specified clustering algorithm for the clustering algorithm to use at each level, wherein the specified algorithm used at a first level differs from the specified algorithm used at a second level.

13. The method of claim 10, wherein the first current input to the clustering algorithm includes a plurality of content files.

14. The method of claim 13, wherein the aggregating of content information includes concatenating contents of content files within each cluster.

15. The method of claim 13, wherein the clustering algorithm is configured to calculate statistical information characterizing the plurality of content files to thereby execute clustering thereof.

16. The method of claim 15, wherein the aggregating of content information includes concatenating the statistical information associated with each cluster.

17. A computer program product, the computer program product being tangibly embodied on a computer-readable medium and including executable code that is configured to cause a data processing apparatus to:

determine a number of levels of a cluster hierarchy;
generate a level of the cluster hierarchy by:
providing a current input to a clustering algorithm, and
obtaining a current output of the clustering algorithm, the current output including a current plurality of clusters,
wherein the current output defines the level;
aggregate content information associated with each cluster of the current output from the clustering algorithm to obtain aggregated content information for each cluster of the current output; and
repeat, until the new level equals the number of levels:
the generating to generate a new level of the cluster hierarchy until the new level equals the number of levels by using the aggregated content information as new current input to the clustering algorithm to obtain a new current output defining the new level of the cluster hierarchy, and
the aggregating using the new current output, when the new level is not equal to the number of levels.

18. The computer program product of claim 17, wherein the determining the number of levels includes receiving a number of clusters to be generated at each level of the cluster hierarchy.

19. The computer program product of claim 17, wherein the determining the number of levels includes receiving a specified clustering algorithm for the clustering algorithm to use at each level, wherein the specified algorithm used at a first level differs from the specified algorithm used at a second level.

20. The computer program product of claim 17, wherein the first current input includes a plurality of content files and the clustering algorithm is configured to calculate statistical information characterizing the plurality of content files to thereby execute clustering thereof, and the aggregating the content information includes concatenating the statistical information associated with each cluster.

* * * * *

UNITED STATES PATENT AND TRADEMARK OFFICE
CERTIFICATE OF CORRECTION

PATENT NO. : 8,316,024 B1
APPLICATION NO. : 13/021278
DATED : November 20, 2012
INVENTOR(S) : Aner Ben-Artzi et al.

It is certified that error appears in the above-identified patent and that said Letters Patent is hereby corrected as shown below:

In column 19, line 23, in claim 3, delete "configured" and insert -- configured to --.

Signed and Sealed this
Fifth Day of February, 2013

Teresa Stanek Rea
*Acting Director of the United States Patent and Trademark Office*